United States Patent Office 2,992,467
Patented July 18, 1961

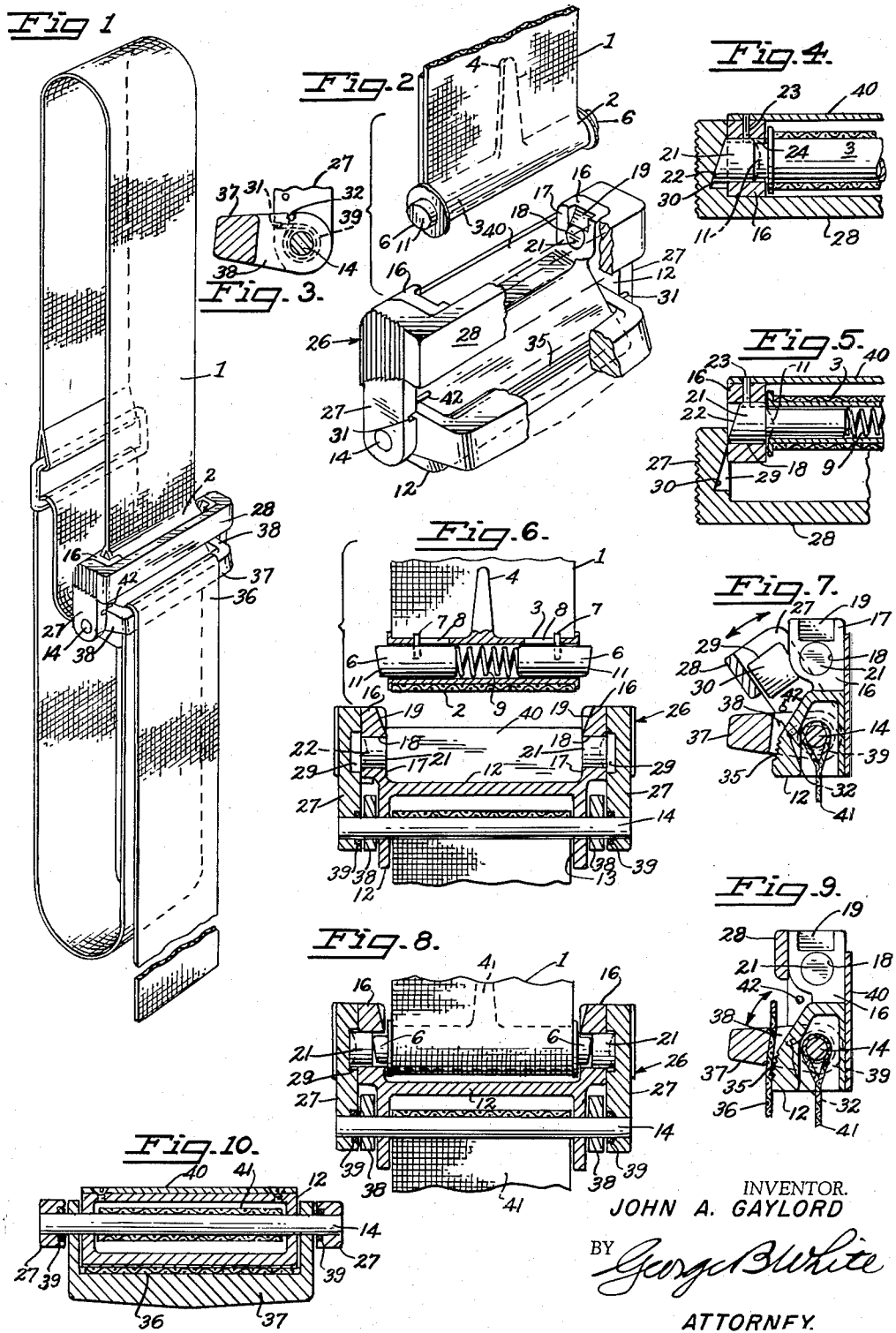

2,992,467
STRAP FASTENER CONNECTION
John A. Gaylord, San Rafael, Calif., assignor to H. Koch & Sons, Corte Madera, Calif., a partnership
Filed Nov. 12, 1959, Ser. No. 852,256
9 Claims. (Cl. 24—230)

This invention relates to a strap fastener connection.

The primary object of this invention is to provide a strap fastener connection which can quickly and positively snap a strap or an end thereof into a fastener so as to be securely held therein and which can be quickly released by the manipulation of a simple releasing member; the relation between the insertable member on the strap and the body of the connector fastener being such as to positively catch the strap in position but to be able to instantaneously and quickly release the catch from the fastener by minimum manipulation.

Another object of the invention is to provide a snap fastener which has means thereon to receive a stiffened portion of a strap with yieldable catches thereon, and on which relatively movable means are provided for pushing the yieldable catches out of engagement of said fastener so as to assure instantaneous release of the strap.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective view showing the strap fastener with a system of straps attached thereto.

FIG. 2 is a developed view showing the stiffener and catches in the end of a strap and the connection elements of the fastener.

FIG. 3 is a sectional fragmental view showing another adjustable strap holder or clamp on the fastener.

FIG. 4 is a fragmental sectional view showing the engagement of the yieldable catch on the end of the stiffener in the sockets of the fastener and showing the catch ejectors in out of the way position.

FIG. 5 is a fragmental sectional view showing the ejectors in position to push the yieldable catches out of the sockets when the movable handle or cam element is pulled past the sockets.

FIG. 6 is a developed sectional view showing the elements of the fastener detached.

FIG. 7 is a cross-sectional view showing the releasing cam element in releasing position.

FIG. 8 is a cross-sectional view showing the arrangement of straps fastened in the fastener.

FIG. 9 is a sectional view showing an adjustable strap clamp engagement on the same fastener; and FIG. 10 is a sectional view showing the pivot shaft mounted in the fastener body.

The combination of straps shown in FIG. 1 is only for illustrative purposes and the straps are linked together for such illustration, but straps in various positions may be secured to the various elements of the fastener herein.

In the herein illustration in the end of a strap 1 is fastened by a suitable loop arrangement 2 a tubular stiffener 3 which extends transversely across the end of the strap 1. From the tubular stiffener extends at right angles a flat central finger 4 projecting longitudinally between the folds of the strap so that the actual stiffener structure in the end of the strap 1 is substantially T-shaped, the head of the T forming the tubular holder for yieldable catch devices.

In each end of the tubular stiffener 3 is a cylindrical catch 6 provided with a limit pin 7 extended from a side thereof, which pin 7 is slidable in a limit slot 8 in the wall of the tubular stiffener 3. A coil spring 9 in the tubular stiffener 3 bears against the inner ends of the catches 6 so as to normally urge the catches 6 outwardly. Each catch 6 has a slanting outer face 11 which is so arranged that the slanting faces 11 converge toward the end of the strap. The pins 7 in the slots 8 prevent the turning of the catches 6 relatively to the tubular stiffener 3.

The tubular stiffener 3 fits into a fastener or buckle which has a fastener body 12 provided with a hollow open base 13 through which latter extends a pivot shaft 14.

From the body 12 extend a pair of opposite ears 16. The ears 16 are spaced so that the inner faces 17 of the ears 16 snugly accommodate the stiffener 3. Through each ear 16 is formed a socket hole 18. Each inner face 17 is cut away and tapered toward the tip of the ear 16 to form an entrance slope 19 for engagement with a slanting face 11 of the adjacent catch 6 and thus facilitate the insertion of the end of the strap 1 between the ears 16. During this insertion the slope 19 gradually presses the catches 6 into the tubular stiffener 3 until the catches 6 are concealed generally flush with the outer ends of the tubular stiffener 3. When the tubular stiffener 3 is in registry with the socket holes 18, the spring pressed catches 6 enter into said socket holes 18 and thus firmly lock the strap 1 in place.

In each socket hole 18 is freely slidable a floating ejector plug 21. Each ejector plug 21 is substantially of the same length as the thickness of the ear 16 or the depth of the socket hole 18. The inner face of each ejector plug 21 is generally in a plane at right angles to the axis of the socket hole 18 so that it is flush with the adjacent face 17 of the ear 16 in the initial position of the plug 21. The outer end of each ejector plug 21 is slanted so as to form a cam face 22. A pin 23 extended through the side of each ear 16 into the socket hole 18 is in engagement with a longitudinal groove 24, on the periphery of the ejector plug 21, so as to hold the ejector plug 21 in properly aligned position, namely in the present illustration to hold the outer cam face 22 slanting transversely with respect to the ear 16.

A manipulating handle yoke 26 has its arms 27 pivoted on the ends of the pivot shaft 14. The outer ends of the arms 27 are connected by a comparatively flat head 28 along one side of the space between the ears 16. The upper ends of the yoke arms 27 are in face to face engagement with the outer faces of the ears 16. In each head 28 there is a cam socket 29 which cam socket 29 has its bottom 30 slanting transversely of the head 28 symmetrically with the slanting cam face 22 of the adjacent ejector plug 21, so that when the catches 6 are in the socket holes 18 the outer faces 11 thereof slant at right angles to the slanting of the ejector camface 22 and of the cam socket bottom 30.

The outer faces of the head 28 are suitably serrated to facilitate the pulling of the handle yoke 26 relatively to the ears 16 from the position shown in FIG. 4 to the position shown in FIG. 5, during which movement the slanting bottom 30 of the cam socket 29 pushes the ejector plug 21 into the socket hole 18 and thereby pushes the spring pressed catch 6 out of the respective socket hole 18 and in a position flush with the inner face 17 of the ear 16 so as to permit the withdrawal of the stiffener 3 on the end of the strap 1 from the fastener.

The fastener body 12 also has a serrated clamping face 35 along and parallel with the pivot shaft 14 for adjustably securing of another strap 36 in the manner shown in FIGS. 1 and 9. For this purpose a clamping yoke 37 has its arms 38 pivoted on the pivot shaft 14 between the ends of the fastener body 12 and the handle yoke arms 27. A coil spring 39 between each clamping yoke arm 38 and the adjacent yoke arm 27 is coiled about the shaft 14 and has one end thereof anchored in a notch 31 in the yoke arm 27 and its other end in a notch 32 in the clamp arm 38 so as to urge the yoke 26 and clamping yoke 37 in opposite directions, namely into their respective initial positions. For instance, as the yoke 26 is pulled into the ejecting position, as shown in FIG. 5, the coil springs 39 are wound so that the yoke 26 when released automatically returns to its initial or locking position. The clamping yoke 37 is normally urged against the serrated face 35.

In operation the end of the strap 1 can be easily snapped into position by pushing the tubular stiffener 3 between the ears 16 so that the slanting portions 19 push the catches 6 into the tubular stiffener 3. When the catches 6 are aligned with the socket holes 18 in the ears 16, then the catches 6 lock into said socket holes 18 and thus the strap 1 is firmly snapped and locked to the fastener. In order to quickly release the strap 1 the serrated tops of the yoke arms 27 are gripped between the thumb and fingers of the operator and the yoke 26 is pulled off the ears 16 to the right viewing FIG. 2, and from the position shown in FIG. 4 into the position shown in FIG. 5, whereby the cam bottom 30 of the yoke socket 29 forces the ejector plugs 21 inwardly of the socket holes 18 and pushes the catches 6 out of the socket holes 18 and into the ends of the tubular stiffener 3, thus releasing the the strap 1 from the connector fastener. The coil springs 31 automatically return the yoke 26 after each operation to its initial position shown in FIG. 4. A back plate 40 extends across the back sides of the ears 16 and over the back of the fastener body 12.

A stop pin 42 extending from one of the yoke arms 27 over the clamping yoke 37 limits the outward pivoting of the yoke 26 by abutting against the clamping yoke 37 to the position shown in FIG. 5. Thus the yoke arms 27 are prevented from completely covering the holes 18 and the ejector plugs 21.

Another strap 41 may be looped over and secured on the pivot shaft 14 inside of the hollow portion 13 of the body 12. A third strap 36 may be adjustably held between the clamping yoke 37 and the serrated clamping face 35 of the fastener body 12.

The connecting fastener herein described is positive in operation, it is easy to manipulate for the purpose of adjusting the straps; the end of the strap 1 with its stiffener can be quickly and positively connected and easily and rapidly released by very slight movements of a hand, and therefore the device is eminently adapted for its purposes.

I claim:

1. In a strap connector, a snap fastener device comprising a body, spaced sockets on said body, an element on the strap fitting between said sockets; axially yieldable catch means in said element fitting into said sockets to interengage said element and said strap with said fastener body; and manipulable means on said body acting through said spaced sockets for pushing said yieldable catch means out of said sockets for releasing said strap at will; said releasing means acting through the sockets including an ejector plug in each of said sockets, a cam end on each ejector plug, and said manipulable means including a handle element movable relatively to said socket, and cam means on said handle element coacting with said cam ends to push said ejector plugs into said sockets for pushing the respective catch means out of said sockets when said cam means are shifted relatively to said cam ends by moving said handle element.

2. In a strap connector, a connector body, a device to detachably fasten a strap to said body, comprising a transverse stiffener secured across said strap, a yieldable catch normally urged outwardly from each end of said stiffener, spaced sockets on said body for receiving the respective catches of the stiffener so as to hold said strap in place, ejector elements in said sockets withdrawable through said sockets when pushed by said catches, and means movable relatively to said sockets to engage and push said ejector elements against said spring catches so as to push said catches out of said sockets and thereby to release said stiffener and said strap from said connector body.

3. The invention defined in claim 2 wherein each ejector element has a slanting cam end adjacent said movable means, and cam means on said movable means engaging the respective slanting cam ends for pushing said ejector elements inwardly of the adjacent socket when said movable means are moved out of an initial position.

4. The invention as defined in claim 2 wherein said movable means include a yoke pivoted on said body, the arms of said yoke being in an initial position adjacent the respective spaced sockets, and cam means on each of said arms adjacent each socket coacting with said ejector elements to push said ejector elements inwardly of said sockets for pushing said catches out of said sockets when said arms are moved off from said sockets.

5. The invention defined in claim 1, and means on said connector body to hold a connecting strap.

6. The invention as defined in claim 2, wherein the outer ends of said catches converge toward the end of the strap, each of said sockets having a slanting entrance portion for engagement with the inclined ends of the catches so as to push the catches into said stiffener for insertion between said sockets until said catches spring into the cavities of said sockets.

7. The invention as defined in claim 2, wherein the outer ends of said catches converge toward the end of the strap, each of said sockets having a slanting entrance portion for engagement with the inclined ends of the catches so as to push the catches into said stiffener for insertion between said sockets until said catches spring into the cavities of said sockets, each of said ejector elements being slidably guided in each of said socket cavities and having a cam surface on its end adjacent said movable means, and each of said movable means having a cam socket therein to receive the cam end of the adjacent ejector element, a cam face in each cam socket coacting with the cam end of the adjacent ejector element for pushing the ejector element into and through said socket cavity when said means are moved relatively to said sockets so as to push said catches out of said socket cavities for releasing said strap.

8. In a strap connector of the character described, a body having a pivot shaft extended therethrough, spaced ears extended from said body, spaced from the pivot shaft, said spaced ears having socket holes therethrough, a manipulating yoke pivoted on said shaft relatively to said body, arms of said yoke being initially in alignment with said socket holes, yieldable catches in said strap being insertable between said ears and fitting into said socket holes, an ejector plug slidable in each socket hole, each yoke arm having a socket therein to receive said ejector plug when pushed by the respective yieldable catch, and coacting cam means between said ejector elements and said yoke arm sockets to push the ejector elements through said socket holes for pushing said catches out of said socket holes when said yoke is shifted from said initial position relatively to said socket holes.

9. The invention defined in claim 8, and said inclined ends of said catches converging toward said sockets in the direction of insertion of the strap into the connector.

References Cited in the file of this patent

UNITED STATES PATENTS 2,580,769    Harman  ---------------- Jan. 1, 1952
2,802,252    Gaylord  ---------------- Aug. 13, 1957